(12) United States Patent
Davies et al.

(10) Patent No.: US 10,049,568 B2
(45) Date of Patent: Aug. 14, 2018

(54) METHOD FOR IDENTIFYING A VEHICLE-BORNE TRANSMITTER

(71) Applicant: QINETIQ LIMITED, Farnborough (GB)

(72) Inventors: Nigel Clement Davies, Worcestershire (GB); Malcolm David MacLeod, Worcestershire (GB)

(73) Assignee: QINETIQ LIMITED, Hampshire (GB)

( * ) Notice: Subject to any disclaimer, the term of this patent is extended or adjusted under 35 U.S.C. 154(b) by 0 days.

(21) Appl. No.: 15/112,950

(22) PCT Filed: Jan. 21, 2015

(86) PCT No.: PCT/EP2015/051102
§ 371 (c)(1),
(2) Date: Jul. 20, 2016

(87) PCT Pub. No.: WO2015/110454
PCT Pub. Date: Jul. 30, 2015

(65) Prior Publication Data
US 2016/0343252 A1 Nov. 24, 2016

(30) Foreign Application Priority Data
Jan. 21, 2014 (GB) .................................. 1401009.4

(51) Int. Cl.
*G06K 9/00* (2006.01)
*G08G 1/017* (2006.01)
(Continued)

(52) U.S. Cl.
CPC ....... *G08G 1/0175* (2013.01); *B60R 25/1025* (2013.01); *B60R 25/305* (2013.01);
(Continued)

(58) Field of Classification Search
None
See application file for complete search history.

(56) References Cited

U.S. PATENT DOCUMENTS 6,025,799 A 2/2000 Ho et al.
6,109,525 A 8/2000 Blomqvist et al.
(Continued)

FOREIGN PATENT DOCUMENTS

EP 1720745 11/2006
EP 2187229 A1 5/2010
(Continued)

OTHER PUBLICATIONS

Search Report under Section 17(5) issued in British Application No. 1401009.4.
(Continued)

*Primary Examiner* — Hadi Akhavannik
(74) *Attorney, Agent, or Firm* — Kenealy Vaidya LLP

(57) ABSTRACT

Some embodiments are directed to a method of identifying a vehicle-borne transmitter emitting an interfering signal over a predefined frequency band. The method comprises monitoring the predefined frequency band at a first location to identify an emission of an interfering signal from a passing vehicle. If an interfering signal is detected, the method further comprises capturing a first image of the passing vehicle to enable an identity of the passing vehicle to be determined.

28 Claims, 10 Drawing Sheets

(51) Int. Cl.
*B60R 25/102* (2013.01)
*B60R 25/30* (2013.01)
*B60R 25/33* (2013.01)
*G01S 19/21* (2010.01)
*G01S 5/06* (2006.01)
*G06F 17/30* (2006.01)
*G06K 9/46* (2006.01)
*G06T 7/20* (2017.01)
*H04N 7/18* (2006.01)
*G06T 7/73* (2017.01)

(52) U.S. Cl.
CPC ............. *B60R 25/33* (2013.01); *G01S 5/06* (2013.01); *G01S 19/21* (2013.01); *G01S 19/215* (2013.01); *G06F 17/30253* (2013.01); *G06F 17/30268* (2013.01); *G06K 9/00785* (2013.01); *G06K 9/46* (2013.01); *G06T 7/20* (2013.01); *G06T 7/73* (2017.01); *H04N 7/188* (2013.01); *G06K 2209/15* (2013.01); *G06T 2207/30252* (2013.01)

(56) References Cited

U.S. PATENT DOCUMENTS

| | | | | |
|---|---|---|---|---|
| 9,286,628 | B2* | 3/2016 | Leopold | G08G 1/015 |
| 2008/0042810 | A1* | 2/2008 | Nakane | B60R 25/1012 |
| | | | | 340/426.18 |
| 2009/0231161 | A1 | 9/2009 | Malarky et al. | |
| 2009/0295633 | A1* | 12/2009 | Pinto | G01S 19/47 |
| | | | | 342/357.29 |
| 2011/0134240 | A1* | 6/2011 | Anderson | H04W 4/006 |
| | | | | 348/143 |
| 2012/0319897 | A1* | 12/2012 | Wendel | G01S 19/03 |
| | | | | 342/357.54 |
| 2013/0201034 | A1* | 8/2013 | Leopold | G07B 15/06 |
| | | | | 340/902 |
| 2013/0307979 | A1 | 11/2013 | Chen et al. | |

FOREIGN PATENT DOCUMENTS

| | | |
|---|---|---|
| EP | 2535737 A1 | 12/2012 |
| JP | 2003165417 A | 6/2003 |
| JP | 2010015399 A | 1/2010 |
| RU | 136401 U1 | 1/2014 |
| WO | 0114905 A1 | 3/2001 |
| WO | 2005082687 A1 | 9/2005 |
| WO | 2014008752 A1 | 1/2014 |

OTHER PUBLICATIONS

International Search Report issued in International Application No. PCT/EP2015/051102.
Written Opinion of the International Searching Authority issued in International Application No. PCT/EP2015/051102.

* cited by examiner

METHOD FOR IDENTIFYING A VEHICLE-BORNE TRANSMITTER

CROSS REFERENCE TO RELATED APPLICATION

This application is a National Phase filing under 35 C.F.R. § 371 of and claims priority to PCT Patent Application No.: PCT/EP2015/051102, filed on Jan. 21, 2015, which claims the priority benefit under 35 U.S.C. § 119 of British Application No.: 1401009.4, filed on Jan. 21, 2014, the contents of which are hereby incorporated in their entireties by reference.

TECHNICAL FIELD

This invention relates to methods and systems for detecting interfering signals being transmitted from moving vehicles. The invention finds particular application for detecting and identifying vehicles suspected of containing jamming devices intended to disrupt the operation of anti-theft tracking devices.

BACKGROUND

Global Satellite Navigation Systems (GNSS) such as the Global Positioning System (GPS), Galileo, GLONASS, COMPASS, BeiDou and the like use a constellation of satellites broadcasting timing signals to allow position and velocity information to be calculated. The timing signals are received and correlated by GNSS receivers to determine the time of flight of the received timing signal from each satellite. The time of flight can then be combined with information about the location of the satellites to calculate the position and velocity of the receiver.

The timing signals are broadcast using spread spectrum techniques due to the weak nature of such signals. The timing signals are broadcast from the satellites on predefined frequency bands, for example the L1 band (1559-1591 MHz), the L2 band (1215-1237 MHz), and the L5 band (1164-1192 MHz).

Tracking devices, such as anti-theft tracking devices, are often fitted to vehicles to allow the movement and location of the vehicle to be remotely monitored. This can be to help locate stolen vehicles or other purposes such as ensuring that vehicles are driven in accordance with traffic regulations.

Tracking devices work in different ways. Some theft-prevention trackers transmit a beacon signal which can be detected by a beacon receiver. Such systems require the beacon receiver to be close enough to the vehicle to detect the beacon signal. Such systems may only have a range of a few kilometers and do not allow the absolute location and heading of vehicle to be remotely monitored.

Other more elaborate tracker systems include a GNSS receiver coupled with a cellular network transceiver. The GNSS receiver generates location data which is periodically transmitted by the cellular network transceiver via the cellular network to a party tracking the vehicle. This may be as a SMS (Short Message Service) text message containing location co-ordinates. This arrangement does not require a dedicated beacon receiver to be operated in the vicinity of the tracker and allows the absolute position of the tracker to be monitored wherever there is cellular network coverage.

One way to disrupt the operation of this type of tracker system is to transmit an interfering signal in the vicinity of the GNSS receiver. An interfering signal is transmitted across or within the GNSS frequency band (i.e. the frequency band on which timing signals are transmitted from the satellites) reducing the signal to noise ratio (SNR) of the received satellite signals at the GNSS receiver. This impairs or entirely prevents the GNSS receiver from generating accurate location data and therefore prevents the system from tracking the location of the vehicle. Although illegal in many jurisdictions, devices adapted to emit such interfering signals ("jamming devices") are relatively inexpensive and readily available. A thief may steal a vehicle and at the same time install a jamming device in the vehicle to prevent it being remotely tracked.

As well as disrupting the operation of tracking devices, the operation of such jamming devices may also interfere with the operation of other nearby GNSS receivers such as those in satellite navigation systems in other vehicles.

Jamming devices could be adapted to broadcast interfering signals on other frequencies such as frequencies on which beacon signals are transmitted, as discussed before, and on frequencies that would interfere with cellular network transmissions.

There is therefore a desire to detect the operation of jamming devices, particularly the operation of a jamming device that may be associated with the theft of a vehicle.

SUMMARY OF INVENTION

In accordance with a first aspect of the invention there is provided a method of identifying a vehicle-borne transmitter emitting an interfering signal over a predefined frequency band. The method comprises monitoring the predefined frequency band at a first location to identify an emission of an interfering signal from a passing vehicle. If an interfering signal is detected, the method further comprises capturing a first image of the passing vehicle to enable an identity of the passing vehicle to be determined.

The presence of an operating jamming device in a vehicle, particularly one emitting interfering signals in a frequency range likely to disrupt the operation of a tracking device, may be indicative of that car being stolen. In accordance with this aspect of the present invention, provided is a method of detecting the presence of interference emitting transmitters (e.g. jamming devices) in the vicinity of an area where vehicles pass, for example on a gantry over a road. Further, on detection of a potentially interfering signal, the method includes an image capture step thereby capturing an image which may contain the vehicle containing the jamming device. Advantageously, the method can be implemented using well established infrastructure (e.g. traffic cameras positioned on gantries) thereby allowing the identity of the vehicle suspected of containing the jamming device to be determined.

Optionally, the method further comprises performing an image recognition process on the first image to recognise a feature of the passing vehicle.

Optionally, the recognised feature is an identifier plate.

Optionally, the method further comprises searching a vehicle identity database comprising vehicle details associated with identifier plate details to determine an identity of the passing vehicle based on the recognised identifier plate.

Systems for recognising an identifier plate (e.g. license plate/number plate) of a vehicle from a captured image are well established and integrated into existing traffic monitoring infrastructure (e.g. traffic camera systems). These systems can be readily adapted to detect the identity of a vehicle suspected of containing a jamming device and provide convenient interfaces for passing the information to third parties, such as law enforcement agencies.

Optionally, the method further comprises capturing time data associated with a time at which the image was captured, and/or capturing location data associated with the first location.

Optionally, the method further comprises generating a vehicle tracking message comprising the recognised identifier plate details and the time and/or location data, and sending the vehicle tracking message to a third party.

By capturing additional information such as time data and location data, further useful information can be passed to third parties attempting to intercept vehicles containing jamming devices, such as the heading of the vehicle at a particular time.

Optionally, the step of monitoring the frequency band at the first location comprises monitoring the frequency band with a plurality of directional antennas, each directional antenna directed in a predetermined direction, and estimating a position of the vehicle in the first image based on which of the directional antennas detected the interfering signal.

Directional antennas are antennas that are adapted to detect emissions from a transmitter from a particular direction. In some examples, to discriminate between multiple vehicles that might be included in the captured image, for example if the camera is directed towards a road with multiple lanes or if the camera captures an image of an area that can be occupied by more than one vehicle, directional antennas can be used to estimate a position of a vehicle when the image was captured. This can be used during the image recognition process to identify an area of the captured image most likely to contain the vehicle containing the jamming device.

Optionally, each predetermined direction corresponds to a lane of a road.

Optionally, the predefined frequency is monitored at a plurality of further locations. The method further comprises capturing further images at each of the further locations where interfering signal is detected, and analysing the first image and the further images by identifying vehicles common to the first image and at least some of the further images to identify the passing vehicle emitting the interfering signal.

In some examples, multiple image capturing arrangements are provided (for example cameras positioned on multiple gantries along a section of road). If a vehicle containing an operating jamming device is travelling along such a section of road, multiple images will be captured. These images can be correlated to estimate further information about the vehicle such as direction and average speed. This may provide further useful information to third parties attempting to intercept the vehicle.

Optionally, the method further comprises capturing time data associated with a time at which the first image and further images were captured, and capturing location data associated with the first location and further locations at which the first images and further images were captured.

Optionally, the method further comprises estimating a direction and/or speed of the passing vehicle based on the time data and location data.

In some examples, monitoring the frequency band at the first location comprises collecting phase change data corresponding to a change in a phase difference between a first phase and a second phase, the first phase being a phase of the interfering signal received at a first position and the second phase being a phase of the interfering signal received at a second position, and estimating from the phase change data a position of the passing vehicle in the image.

Conventional techniques for estimating the location of a transmitter relative to a number of spatially diverse receivers are known. These techniques involve comparing differences between the signal received at the different receivers (e.g. difference in time delay of arrival or difference in the frequency of the signal) and deriving from this information about the location and/or speed of the transmitter relative to the receivers.

However, such conventional techniques are not generally appropriate for use in tracking motor vehicles because the speeds and distances involved do not give rise to sufficiently large differences in the signal to generate accurate information and several receivers are typically required.

However, in accordance with this example, it has been recognised the change in phase difference between an interfering signal received at two receivers does provide useful information about the track of a vehicle (i.e. the path followed by a vehicle along the ground), even at the relatively low speeds and distances arising during the movement of a typical motor vehicle. Information about the track of a vehicle as it passes two receivers can be used to accurately determine its position in a captured image.

In some examples the step of estimating the position of the passing vehicle in the image comprises fitting the phase change data to a phase change model, said phase change model being a model of the change in the phase difference between the first and second phase using a set of parameters, said parameters including a speed and track of a vehicle; determining parameters of the model; generating from the parameters of the model an estimated track and estimated speed of the passing vehicle, and using the estimated track and estimated speed of the passing vehicle to determine a position of the passing vehicle within the captured image.

Optionally, the predefined frequency band is a frequency band within which GNSS signals are transmitted.

Optionally, the first location is a gantry positioned over a road.

In accordance with a second aspect of the invention, there is provided a system for identifying a vehicle-borne transmitter emitting an interfering signal over a predefined frequency band. The system comprises a detector positioned at a first location arranged to monitor the predefined frequency band and to identify an emission of an interfering signal from a passing vehicle and a camera. If the detector detects an interfering signal, the detector is arranged to send a trigger signal causing the camera to capture a first image of the passing vehicle thereby enabling an identity of the passing vehicle to be determined.

Optionally, the system further comprises an image processor arranged to perform an image recognition process on the first image to recognise a feature of the passing vehicle.

Optionally, the recognised feature is an identifier plate.

Optionally, the system further comprises a camera control unit arranged to capture time data associated with a time at which the image was captured, and/or capture location data associated with the first location.

Optionally, the image processor is arranged to receive the time data and location data generated by the camera control unit and generate a vehicle tracking message comprising recognised identifier plate details of the passing vehicle and the time and location data. The image processor is operable to send the vehicle tracking message to a third party.

Optionally, the detector comprises a plurality of directional antennas, each directional antenna directed in a predetermined direction, the detector arranged to communicate a message to the image processor indicating which directional antenna detected the interfering signal, the image processor arranged to identify a position of the vehicle based on which of the directional antennas detected the interfering signal.

Optionally, each predetermined direction corresponds to a lane of a road.

Optionally, the system further comprises detectors and cameras at a plurality of further locations arranged to capture further images at each of the further locations where interfering signal is detected, and said image processor is arranged to analyse the first image and the further images by identifying vehicles common to the first image and at least some of the further images to identify the passing vehicle emitting the interfering signal.

Optionally, the system further comprises respective camera control units at each further location, each camera control unit arranged to capture time data associated with a time at which each further image is captured, and to capture location data associated with each respective further location at which each further image is captured.

Optionally, the detector comprises an antenna at a first position connected to a first receiver and an antenna at a second position connected to a second receiver and a phase difference analyser unit, said phase difference analyser unit arranged to collect data corresponding to a change in a phase difference between a first phase and a second phase, the first phase being a phase of the interfering signal received by the first receiver and the second phase being a phase of the interfering signal received by the second receiver, and the image processor is arranged to estimate a position of the passing vehicle in the image from an output of the phase difference analyser unit.

Optionally, the phase difference analyser is arranged to fit the phase change data to a phase change model, said phase change model being a model of the change in the phase difference between the first and second phase using a set of parameters, said parameters including a speed and track of a vehicle; determine parameters of the model, generate from the parameters of the model an estimated track and estimated speed of the passing vehicle; transmit data corresponding to the estimated track and estimated speed of the passing vehicle to the image processor, thereby enabling the image processor to estimate a position of the passing vehicle in the image.

Optionally, the predefined frequency band is a frequency band within which GNSS signals are transmitted.

Optionally, the first location is a gantry positioned over a road.

In accordance with a third aspect of the invention, there is provided a computer program comprising computer readable instructions which when loaded on a computer performs a method according to the first aspect of the invention.

In accordance with a fourth aspect of the invention, there is provided a computer program product comprising a computer program according to third aspect of the invention.

Various further aspects and features of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
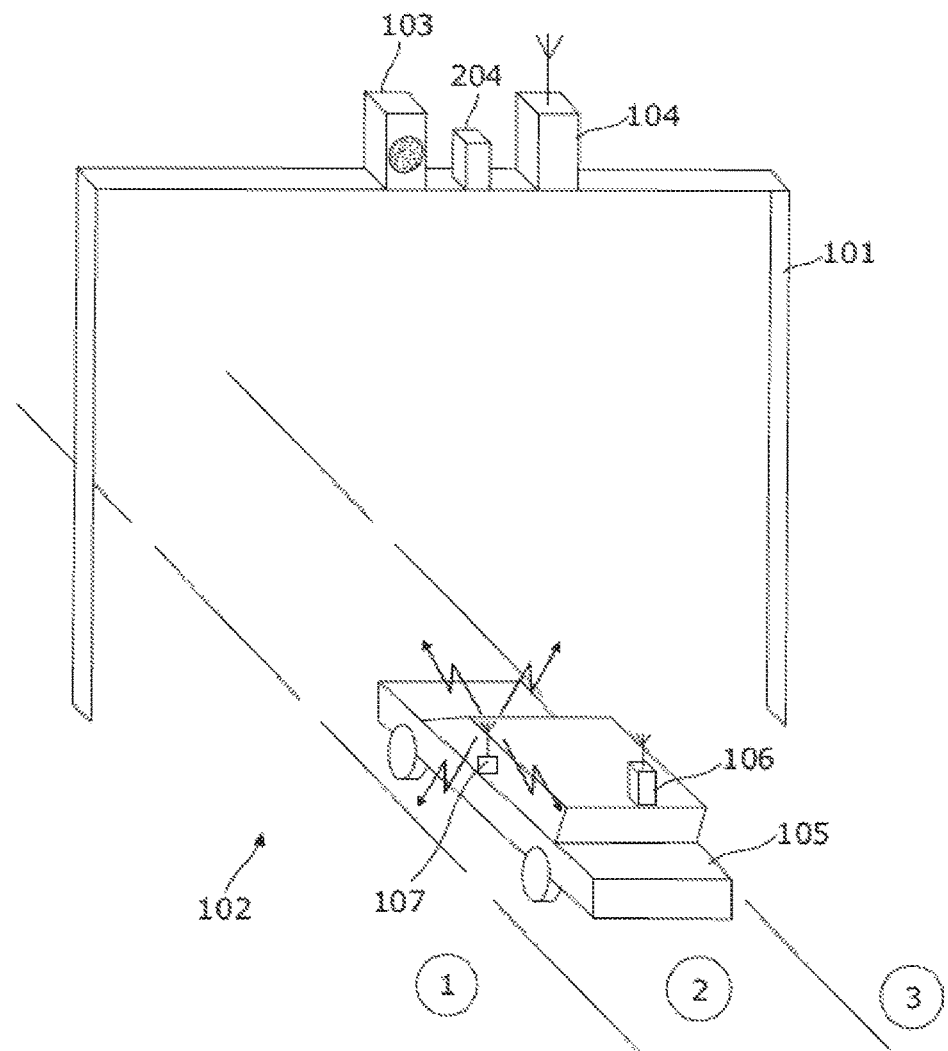
FIG. 1 provides a schematic diagram of a vehicle identification system arranged in accordance with an example of the invention.

FIG. 1 provides a schematic diagram of a vehicle identification system arranged in accordance with an example of the invention. The system is arranged to identify vehicles which may contain jamming devices emitting interfering signals.

A gantry 101 is positioned above a road 102. As is typical on many vehicle highways, the road 102 includes multiple lanes. In the example shown in FIG. 1, the road 102 comprises three lanes, marked 1, 2 and 3 respectively. The road 102 carries traffic in one direction and would typically be complemented with an adjacent road (not shown) carrying traffic in the opposite direction.

The gantry is provided with camera 103 and a detector 104. The camera 103 is arranged to capture images of vehicles passing underneath the gantry 101. The detector 104 is arranged to detect the emission of signals within (i.e. over or across) a predefined frequency band. On detection of a signal being emitted within the predefined frequency band the detector is arranged to send a trigger signal to a control unit 204 that controls the camera 103 to capture an image of the road beneath the gantry 104.

Typically, the camera 103 is directed to take images of vehicles as they recede from the gantry 101. The control unit 204 and camera are calibrated such that an image is taken of a specific area of the road 102 beyond the gantry 101. Typically, this area of the road 102 is an area that a vehicle travelling within the normal range of speed would be expected to be within at a predetermined time after the interfering signal has been detected by the detector 104.

FIG. 1 shows a vehicle 105 travelling along the road 102 towards the gantry 101. The vehicle 105 includes a GNSS based tracking device 106 including a GNSS receiver and cellular network transceiver as described previously. The vehicle 105 also contains a jamming device 107 arranged to emit an interfering signal across the frequency band on which GNSS satellite signals are broadcast (the "GNSS frequency band"). As described previously, the emission of the interfering signal by the jamming device 107 is such that it prevents the tracking device 106 from generating accurate location data. A thief may have stolen vehicle 105 and brought the jamming device 107 into the vehicle 105 in order to prevent it from being tracked remotely.

Detector 104 is arranged to detect signals being emitted within the GNSS frequency band. As the vehicle 105 approaches, the detector 104 detects the emission of the interference signal from the jamming device 107 and sends the trigger signal to the camera 103 via control unit 204. The camera 103 then captures an image of the road 102 beneath the gantry 101. The image will include the vehicle 105. As will be described in further detail below, the captured image can be processed to identify the vehicle 105.

Figure 2:
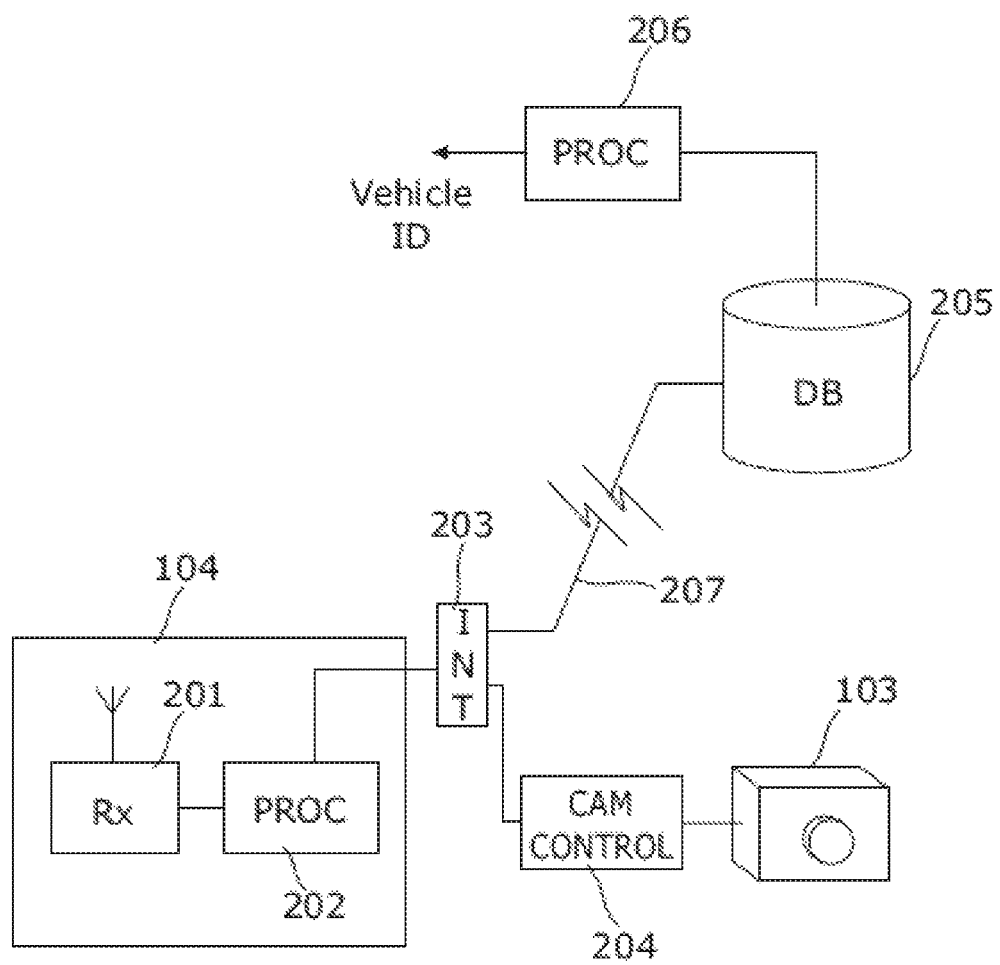
FIG. 2 provides a schematic diagram illustrating in more detail components of the system shown in FIG. 1.

FIG. 2 provides a schematic diagram illustrating in more detail components of the system shown in FIG. 1. The detector 104 includes a receiver 201 tuned to receive signals emitted of the GNSS frequency band and a processor 202. The processor 202 is arranged to analyse the output of receiver 201 and determine if the output indicates that an interfering signal has been detected. The processor 202 is connected to the camera control unit 204 via an interface 203. The camera control unit 204 is connected to the camera 103. If the processor 202 determines that an interfering signal has been detected the trigger signal is sent via the interface 203 to the camera control unit 204. The camera control unit 204 then controls the camera 103 to capture an image. Image data is then sent from the camera 103 via the camera control unit 204 and interface 203 to an image database 205. Typically the image database 205 will be at a different location than the gantry 101 and therefore the image data will be sent via a suitable communication link 207.

As mentioned above, the processor 202 is arranged to analyse the output of receiver 201 and determine if the output indicates that an interfering signal has been detected. This can be done using any suitable processing technique.

For example, in a first processing technique a method of spectrum analysis (for example a windowed FFT) is applied repeatedly, delivering a continuous sequence of power spectra. By processing the resulting successive power spectra (using averaging or other smoothing filtering), the normal (background) power level is estimated across the frequency band. As each new power spectrum is generated, its level at each frequency across the band is compared with the estimated background level. If it sufficiently exceeds the background level at one or more frequencies, and the presence of an interfering signal is inferred the processor generates the trigger signal.

In a second processing technique, processing similar to that described in the preceding paragraph is applied sequentially to different sub-bands in turn, i.e. a "scanning" approach. Because this reduces the "instantaneous band width" which is received and processed, it makes receiver design and/or processor design simpler and/or less costly. However, it means that only part of the spectrum is monitored at each instant. The scanning techniques used in both these examples are well known in the art of electronic surveillance.

Returning to FIG. 2, typically the camera control unit 204 will add time data and gantry location data to the image data sent to the image database 205. The time data indicates a time at which the image was captured and the gantry location data indicates the location of the gantry 101. In other examples, if the location of the gantry 101 is already known, then the location can be derived by simply providing gantry identification data that identifies the gantry.

The image database 205 is connected to an image processor 206 arranged to perform image processing on the image data received via the communication link 207. In some examples the image processing performed by image processor 206 includes a vehicle recognition process that attempts to identify the vehicle from the image data based on some aspect (i.e. feature) of a vehicle captured in the image.

In most jurisdictions vehicles are required to be fitted with an identifier plate bearing various characters (e.g. numbers and letters) that allow the vehicle to be uniquely identified (commonly referred to as a "number plate", "registration plate", "tag", "licence plate" and so on). The identifier plate is typically associated with further information such as the vehicle manufacturer, model, age and an identity and address of the owner of the vehicle.

In some examples the image processor 206 is arranged to perform an identifier plate recognition process which attempts to determine the identity of the vehicle by recognizing the numbers and characters displayed on the identifier plate of vehicles captured in the image. Techniques for performing this process are well known in the art.

Once the image processor 206 has performed the identifier plate recognition process and has recognised the identifier plate of the vehicle in the image (e.g. determined the string of characters shown on the identifier plate) it can be arranged to send information corresponding to the characters of the identifier plate (recognised identifier plate details) to a third party such as, for example, law enforcement authorities. This information can also include the time data and gantry location data discussed previously. In this way it is possible to determine the identity and location of a vehicle containing a jamming device at a particular time. It is also possible to determine the direction of travel at the instant the image was captured based on the direction of travel of traffic travelling under the gantry. As an example, the information (a vehicle tracking message) passed onto a third party from the processor 206 may be in the form of:

Vehicle bearing identifier plate XYZ 123, pictured at 1300 hrs at point A, on Highway B, travelling northbound.

On receipt this information, a vehicle identity database comprising vehicle details associated with identifier plate details can be searched to determine an identity of the passing vehicle based on the recognised identifier plate and further details such as the name and address of the owner.

As is known, many highway networks include multiple gantries distributed at intervals along their length. If the gantry arrangement shown in FIG. 1 is repeated on some or all of these gantries it will be possible to estimate the speed and heading of vehicles suspected of containing jamming devices. With modern communication interfaces and image processing techniques it is possible that the arrangement shown in FIG. 2 will allow this to occur in real time or near real time. This may allow such vehicles to be more readily intercepted.

Comparing Successive Images

As shown in FIG. 1, most highway networks comprise roads that include multiple lanes in both directions. At busy times it is likely that more than one vehicle will be passing under a gantry at a particular time. It may be difficult to accurately identify a vehicle containing the jamming device if the image contains multiple vehicles.

However, if a vehicle containing a jamming device emitting an interfering signal is travelling along a highway network provided with a number of gantries as shown in FIGS. 1 and 2, the images will be captured at successive gantries in the direction of travel of the vehicle. Therefore, in some examples the image processor 206 is arranged to compare images captured from a number of adjacent gantries to identify vehicles that are common to each image. This can be achieved by the image processor 206 performing the identifier plate recognition process on every vehicle in each image and then identifying identifier plates that are common to each image. If one vehicle is common to several successively captured images then there is a high probability that this individual vehicle is the vehicle containing the jamming device. Additional information may also be derived in this way for example the average speed and the direction of a vehicle in question based on analysing time data and location data associated with all the images determined to contain an image of the vehicle suspected of containing the jamming device.

Directional Antennas

In one example, to further discriminate between multiple vehicles passing under the gantry at any one time, directional antennas can be employed. Each gantry may be fitted with a directional antenna arranged to detect interfering signals from vehicles travelling in a particular lane of the road. For high speed roads, such as multi-lane highways, the road will typically be long and straight relative to the position of the antenna on the gantry. Directional antennas can therefore be readily configured to detect interfering signals emitted from vehicles in one particular lane of the road.

Figure 3:
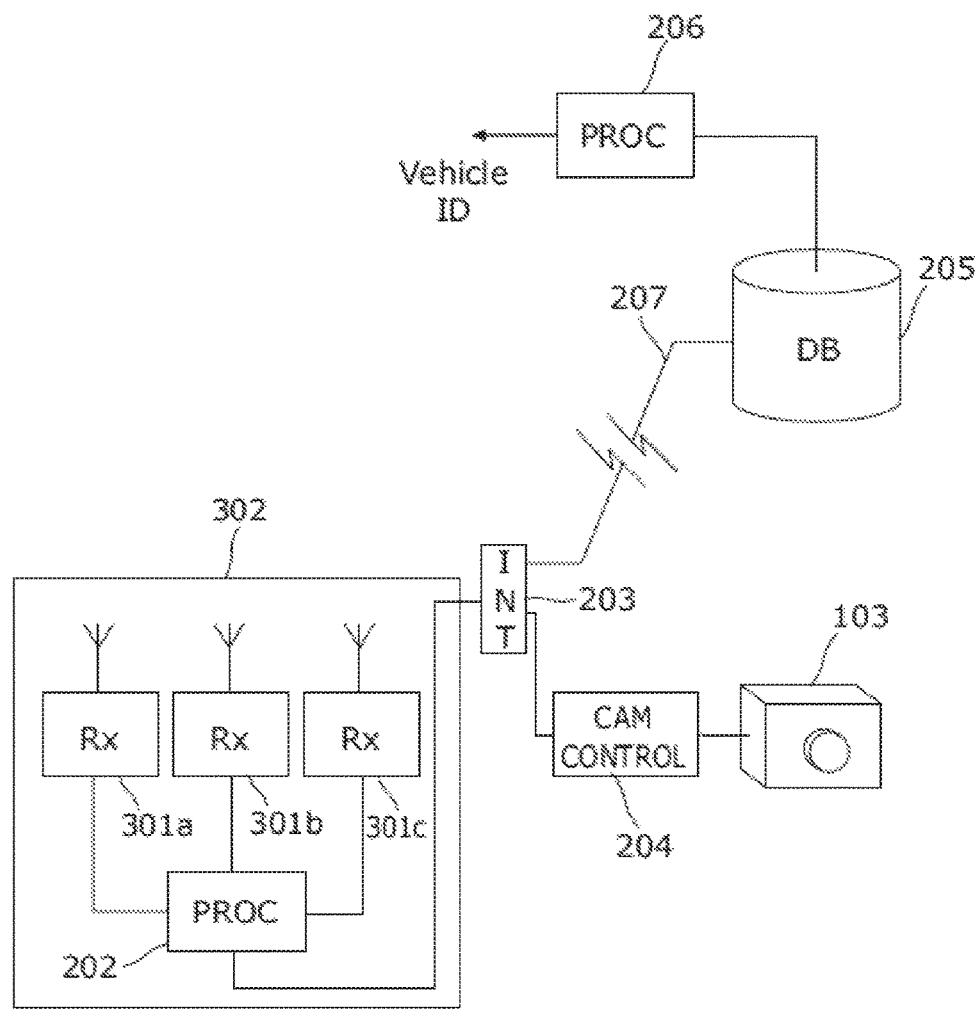
FIG. 3 provides a schematic diagram of a system corresponding to that shown in FIG. 2 but adapted to include multiple directional antennas.

FIG. 3 provides a schematic diagram of a system corresponding to that shown in FIG. 2 but adapted to include multiple directional antennas, with each directional antenna corresponding to one lane of a three lane road.

The modified detector unit 302 includes three receivers 301a, 301b, 301c. Each receiver 301a, 301b, 301c is coupled to a directional antenna that is configured to detect signals emitted from vehicles travelling along a particular lane of the road. As before, each receiver 301a, 301b, 301c is tuned to receive signals emitted in the GNSS frequency band. The processor 202 is arranged to receive the output of each receiver 301a, 301b, 301c and determine when the receivers 301a, 301b, 301c have detected an interfering signal being emitted within the GNSS frequency band. This is achieved using any suitable technique, for example in accordance with the first or second processing techniques described above. When the processor unit 202 determines that one of the directional antennas has detected an interfering signal, the processor 202 sends a trigger signal to the camera control unit 204 via the interface 203 as described previously. However, the processor 202 is also arranged to include an indication in the trigger signal as to which directional antenna has detected the interfering signal. The camera control unit 204 controls the camera 103 to capture an image as described previously, however, when the image data is sent to the image database 205, additional information is included indicating which lane the directional antenna which detected the interfering signal was configured to focus on. The image processor 206 can then analyse the image for vehicles in a particular lane. This process is described further with reference to FIG. 9.

In further examples, the gantry may be fitted with a camera directed at each lane. In this way, when a directional antenna directed at a particular lane detects an interfering signal, a trigger signal is sent via the control unit to the camera covering that lane and in the image is captured and corresponding image data is sent to the image database 205.

Phase Measurement Technique

Figure 4:
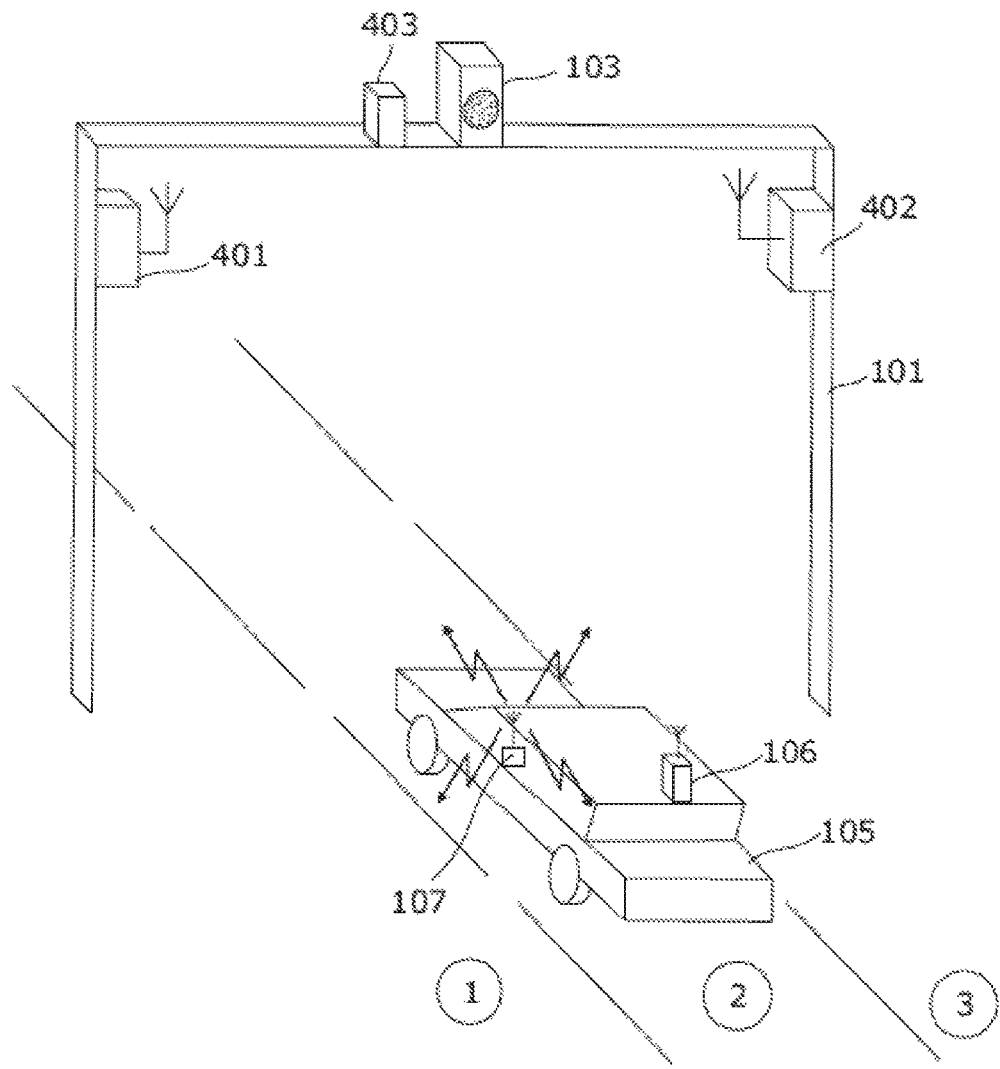
FIG. 4 provides a schematic diagram of a vehicle identification system arranged in accordance with another example of the invention.

FIG. 4 provides a schematic diagram of a vehicle identification system arranged in accordance with another example of the invention.

In keeping with the system described with reference to FIG. 1, the system includes a gantry 101 with a camera 103. The system further includes a detector array comprising a first antenna and receiver 401 and a second antenna and receiver 402. The first and second antennas 401, 402 are positioned either side of the gantry 101, e.g. the first antenna 401 is positioned towards the left side of the gantry and the second antenna is positioned towards the right side of the gantry. The first and second receivers 401, 402 are connected to the camera 103 via a control unit 403.

The first and second receivers 401, 402 are arranged to detect the emission of interfering signals and in response, the control unit 403 is arranged to control the camera 103 to capture an image of vehicles passing under the gantry 101. However, additionally, as will be described in more detail below, the emitted signals detected by the first and second receivers 401, 402 are processed to estimate a position of the vehicle passing under the gantry 101 which has triggered the capturing of the image. This is done based on the change in the difference between the phase of interfering signal received at the first detector 401 and the phase of the interfering signal received at the second detector 402. As explained in more detail below, the image processor 206 is arranged to estimate a position of the vehicle in the image from an output of a phase difference analyser unit.

In electronic surveillance, transmitter location techniques based on the comparison of the received signal at spatially diverse receivers are well known. However, as set out below, they are generally not appropriate for use in applications involving relatively low-speed and small distances such as those shown in FIGS. 1 and 4.

For example in one technique the time taken (i.e. time delay) of a signal of interest to reach various receivers is calculated. The time delay between the arrival of the signal of interest at a first receiver and the arrival of the signal of interest at one or more other receivers is continuously estimated. This measurement is known as the Time Difference of Arrival (TDOA).

At any particular instant, the TDOA value depends on the position of the transmitter in relation to the position of the receivers. If the relative positions of the receivers are known, the TDOA between different receivers can be used to estimate a position of the transmitter relative to the receivers.

Generally it is not possible to make an unambiguous measurement of the position of the transmitter using a TDOA measurement with only two receivers, because, typically, the same TDOA measurement arises from transmitter positions anywhere along a hyperbolic curve. In practical position fixing systems which use TDOA it is therefore necessary to use three or more receivers. Furthermore the position fixing accuracy which can be achieved by TDOA techniques is too poor to be useful in this application.

In an example of another technique, a frequency offset between the signal of interest as received at a different receivers is calculated. This measurement is known as the Frequency Difference of Arrival (FDOA).

At any particular instant, the FDOA depends on rates of change of the distances between the transmitter and the receivers. This technique therefore relies on relative motion between the transmitter and receivers and is generally restricted to applications in which the receivers are on a moving platform such as an aircraft, since the aircraft own motion is known. Generally, this technique is not used in applications using static receivers and a moving transmitter, since the motion of the transmitter is typically unknown.

Generally, FDOA based position fixing techniques are used in applications involving aircraft and other airborne vehicles. As will be appreciated, the relative speeds between transmitter and receivers in such applications are far greater than those likely to be seen in the systems depicted in FIGS. 1 and 4.

As a result, values of the TDOA and FDOA between the detectors 401, 402 for interfering signals emitted from vehicle-borne transmitters passing beneath the gantry 101 would be very small. Generally they would be too small to enable useful information about the position and motion of the transmitter to be calculated.

Figure 5:
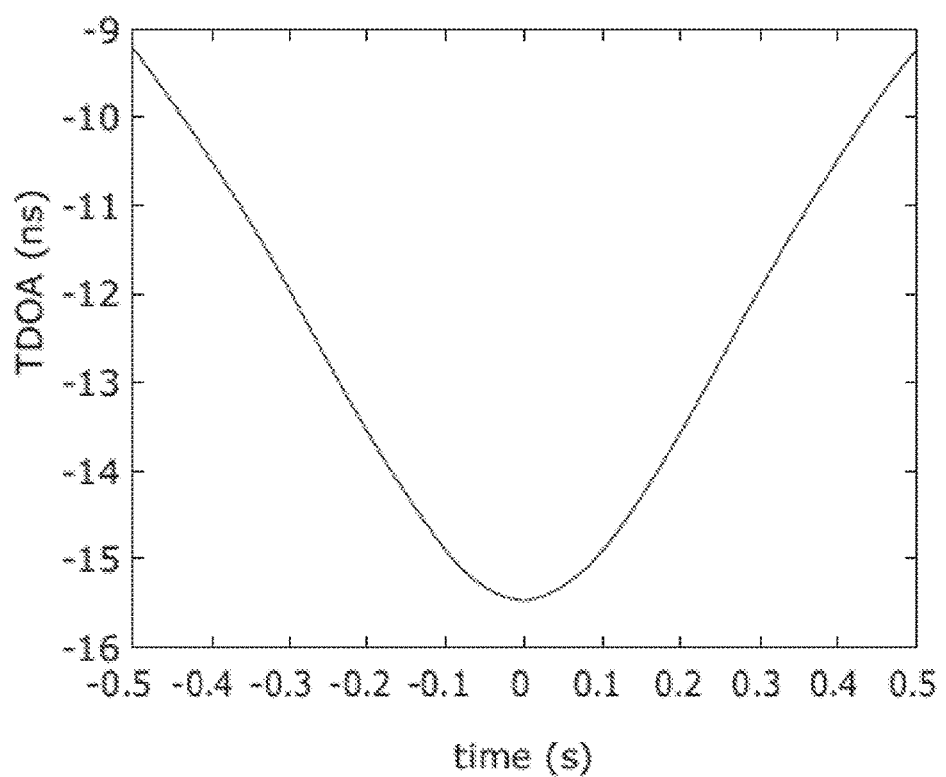
FIG. 5 provides a plot illustrating a simulation of typical TD OA values that might be expected to arise in the system shown in FIG. 4.

This is illustrated in FIG. 5.

FIG. 5 provides a plot illustrating a simulation of typical TDOA values that might be expected to arise in the system shown in FIG. 4.

The plot shows the TDOA between first and second detectors 401, 402 assuming the detectors 10 m apart on the gantry 101, and that the first and second detectors 401, 402 are 5 m vertically higher than a transmitter of a jamming device in a vehicle travelling along the road passing under the gantry. The simulation further assumes that the vehicle on the ground and travelling at 20 m/s (approximately 40 mph). The simulation assumes the vehicle is in lane 1.

The plot shows that the TDOA (i.e. the difference in the arrival time of the interfering signal at the first detector 401 and the arrival time of the interfering signal at the second detector 402) varies over a maximum range of about 6 ns.

This small TDOA variation (6 ns) means that conventional methods of measuring time difference are not feasible. Conventional methods typically exploit the fact that the interfering signal is usually modulated. The modulation bandwidth of signals of interest (i.e. GNSS signals) lies somewhere between 1 kHz and 40 MHz, and even at the most advantageous bandwidth, 40 MHz, the accuracy with which time difference can be measured in this way is only around 10-20 ns. As the bandwidth falls this accuracy worsens even further, in proportion.

Conventionally therefore, techniques based on determining differences in the arrival of the interfering signal at different transmitters would be rejected for use in interference detecting systems as described above.

However, unlike TDOA techniques (which produces values that are too small to be useful) and FDOA techniques (which require knowledge of the motion of the transmitter), in accordance with some examples of the present invention, it has been recognised that comparing the difference between the phase of the interfering signal received at the first detector and the phase of the interfering signal received at the second detector provides useful information about the position of the interfering transmitter despite the low speeds and distances arising in the system shown in FIG. 4.

Figure 6A:
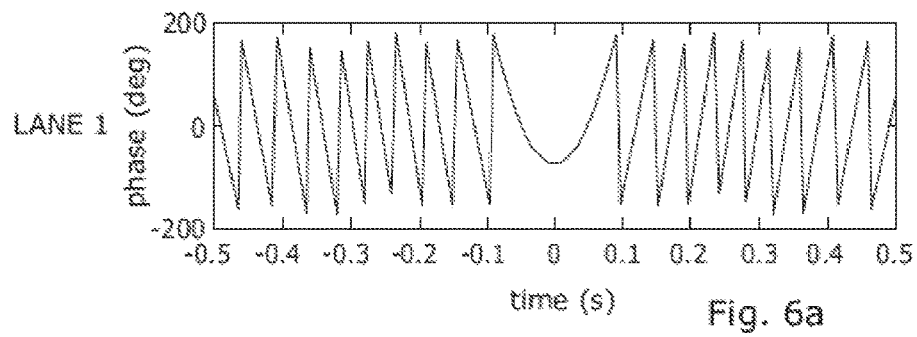
FIGS. 6a, 6b and 6c provide plots illustrating curves of a simulation of a vehicle passing between two receivers in different lanes.
Figure 6B:
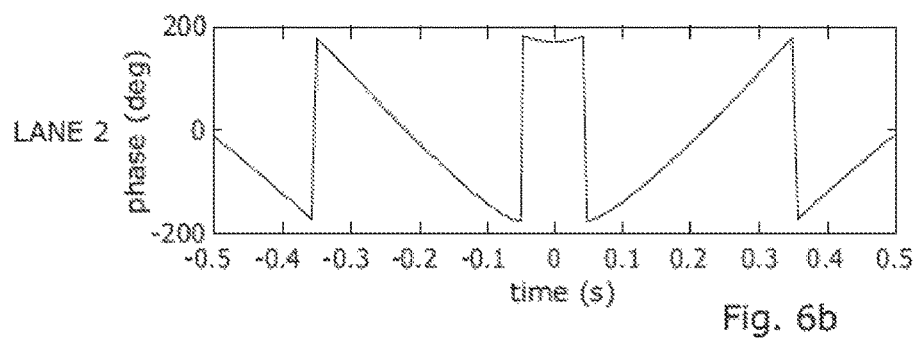
Figure 6C:
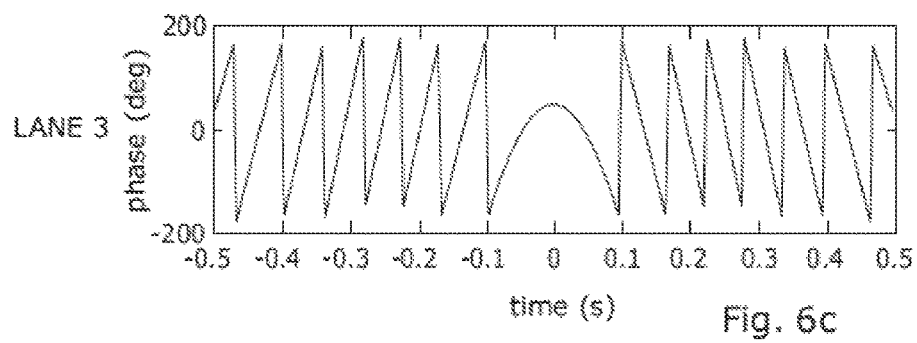

This is illustrated in FIGS. 6a, 6b and 6c.

FIGS. 6a, 6b and 6c provide plots of the simulated change in the difference between the phase of the interfering signal received at a first detector and the phase of the interfering signal received at the second detector (referred to from this point forward as the "phase difference change") as the vehicle moves towards under the gantry that might be expected to arise in the system shown in FIG. 4. These simulations are based on a phase change model which is a model of the change in the phase difference between the signal received at the two detector using a set of predefined parameters.

The parameters include the speed and track of the vehicle and spacing data associated with the position of the doctors relative to each other and relative to the road along which the vehicle travels. The simulations are generated using these parameters and known information about the propagation of electromagnetic emissions.

The simulations shown in FIGS. 6a, 6b and 6c are based on a transmitter travelling at a fixed speed towards, under, and then away from two detectors at fixed positions apart from each other and a fixed position above the road.

FIG. 6a shows a first curve of a simulation of a transmitter passing under the gantry 101 in lane 1; FIG. 6b shows a second curve of a simulation of a transmitter passing under the gantry 101 in lane 2; and FIG. 6c shows a second curve of a simulation of a transmitter passing under the gantry 101 in lane 3.

The other parameters used are the same for each simulation, i.e. the spacing of the detectors on the gantry; the vertical height of the detectors above the road; and the speed of the vehicle bearing the transmitter.

As can be inferred from the plots in FIGS. 6a, 6b and 6c, as a transmitter approaches, passes and recedes from the gantry, the way in which the TDOA of the interfering signal varies is a function of the track (e.g. lane 1, lane 2 or lane 3) which the vehicle takes under the gantry. This variation in the TDOA is manifested in a changing value for the difference in phase between the interfering signal detected at the first detector and the interfering signal detected at the second detector.

It has been recognised that because the phase difference change is characteristic of which track the vehicle bearing the transmitter is travelling in (as clearly shown in the simulations illustrated in FIGS. 6a, 6b and 6c), collecting and analysing phase difference change data provides an advantageous means by which to estimate the position of a vehicle as it passes under the gantry, thereby making accurate identification of a vehicle bearing an interfering transmitter easier from images captured of vehicles passing under the gantry. Furthermore, in some examples, additional information can be derived from the phase difference change such as the direction of travel and speed of the vehicle.

As explained below, a non-linear optimisation process can be used to fit collected phase difference change data with simulated phase difference data (exemplified by the plots shown in FIGS. 6a, 6b and 6c). This process will determine which values of the simulation parameters (including vehicle track) best fit the observed data and therefore allow the position of the vehicle to be estimated.

Further, if the track that the vehicle followed was significantly non-straight over the short distances involved (10 s of meters of travel) further parameters could be included to describe that curvature.

Figure 7:
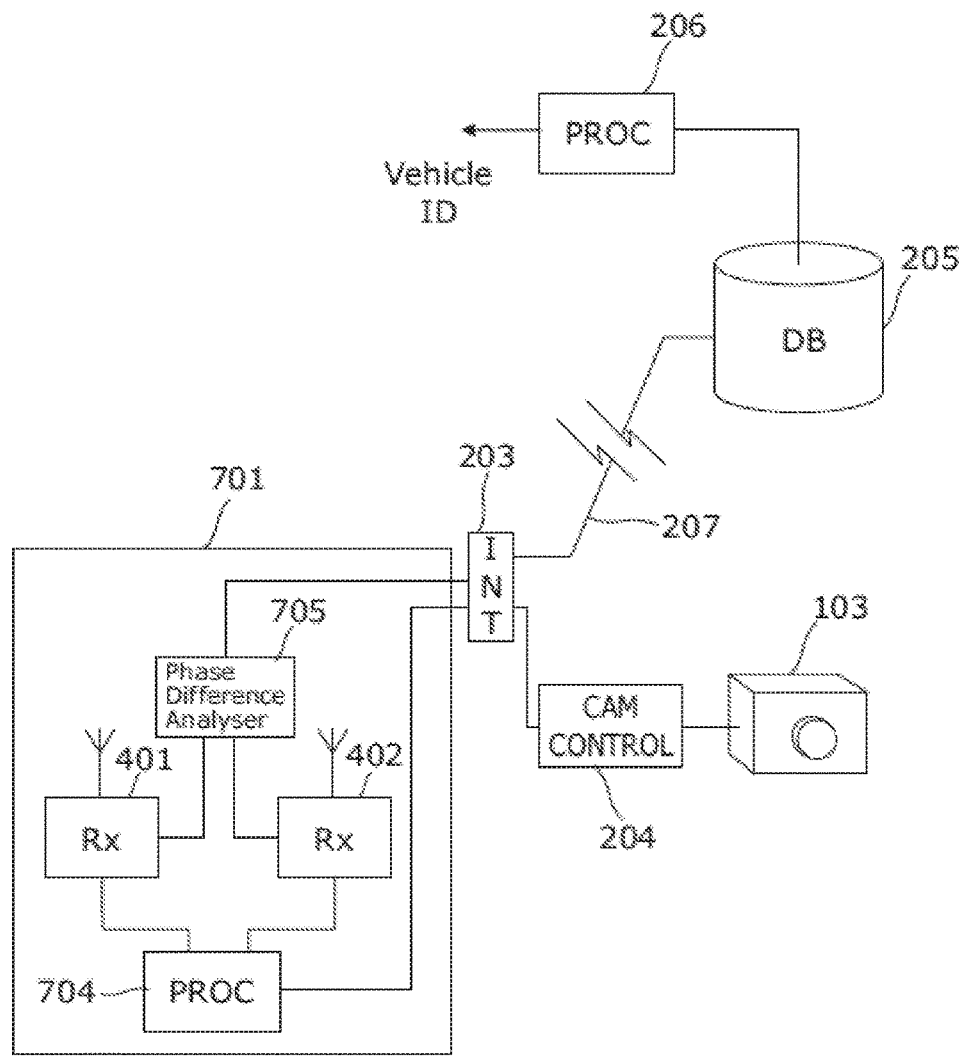
FIG. 7 provides a schematic diagram illustrating in more detail components of the system shown in FIG. 4.

FIG. 7 provides a schematic diagram illustrating in more detail components of the system shown in FIG. 4 and describing an example of the phase difference change being used to calculate information about the position of a vehicle when an image of the vehicle is captured.

The components of system shown in FIG. 7 correspond to those shown in FIG. 2 except that a modified detector array 701 is provided that as well as detecting the emission of an interfering signal, is also arranged to estimate the position of a vehicle bearing the transmitter emitting the interfering signal as it passes under the gantry.

The detector array 701 comprises the first and second antennas and receivers 401, 402 each connected to a processor 704. The processor 704 is arranged to analyse the output of the receivers 401, 402 and determine if the output indicates that an interfering signal has been detected. This can be performed in the same manner as described above with reference to FIG. 2.

The detector array 701 further comprises a phase difference analyser 705. The phase difference analyser 705 is a processor arranged to monitor the receivers 401, 402 to determine the difference between the phase of the interfering signal received from the first antenna 401 and the phase of the interfering signal received at the second antenna 402 as a vehicle passes under the gantry (i.e. collect phase difference change data). As will be understood, the phase difference change data typically comprises a plurality of phase difference values collected over a predefined period of time.

The phase difference analyser 705 is pre-loaded with phase change model data which allows phase difference change data (such as the plots shown in FIGS. 6a, 6b and 6c) to be calculated for different parameters (e.g. track and speed of the vehicle.) The phase change model takes various real-world parameters into account such as the fact that the first and second detectors are stationary relative to each other and occupy a fixed position in space above the road (and therefore the transmitter). Other assumptions can be reasonably made, e.g. that the vehicle is travelling at ground level.

The phase difference analyser 705 performs a non-linear optimisation technique to identify a simulated set of phase difference data which results in phase difference data that best fits the observed phase difference data. The parameters of the simulated set of phase difference data (e.g. speed and track of the vehicle) can then be estimated and output and used to estimate the position of the vehicle.

Figure 8:
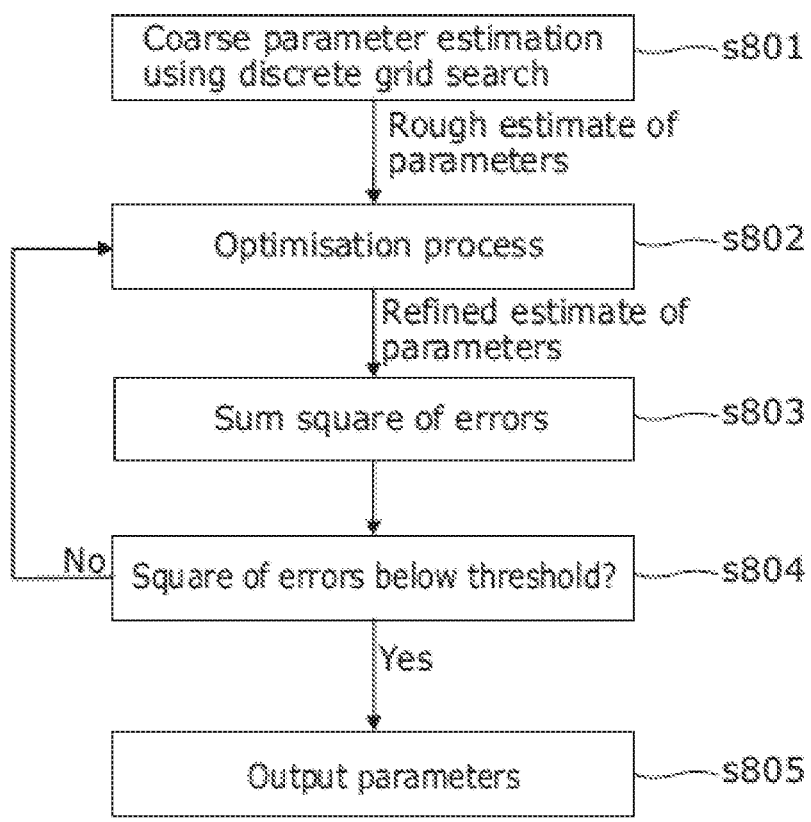
FIG. 8 provides a flow chart illustrating an example of a parameter estimating algorithm.

Following a detection event (i.e. an interfering signal being detected), the phase difference detector is arranged to perform a parameter estimating algorithm on the collected phase difference change data. An example of such an algorithm is schematically illustrated in FIG. 8.

A step s801 a coarse parameter match is made using, for example, a discrete grid search based technique. This compares estimated phase difference change data generated from the pre-loaded phase change model with the observed phase difference change data. A coarse estimate of the modelled parameters of the movement of the vehicle (e.g. track and speed of the vehicle) is then generated.

At step s802, an optimisation process is used whereby the coarse estimate of the parameters are refined with the aim of producing estimated parameters that produce estimated phase difference change data closer to that of the observed phase change data.

At step s803 a sum of the square of errors is calculated between the observed phase difference change data and the estimated phase difference change data generated at s802. At s804 the sum of the square errors is tested to determine if it is above or below a threshold level. If it is not below the threshold level, the algorithm returns to step s802 and the estimated parameters are refined again.

Once the square of errors tested at step S804 falls below the requisite threshold, the parameters are output, indicative, for example of the speed and track of the vehicle. As will be understood, the timing information of the camera is known (i.e. the instant in time at which the image is captured), this information can then be correlated with the estimated parameters to calculate a position of the vehicle in the captured image.

The phase difference analyser is then arranged to identify output a vehicle position message identifying a lane in which the vehicle containing the jamming device is estimated to be in.

If the combination of the receivers 401, 402 detects an interfering signal and sends the trigger signal to the camera control 204 an image is captured as described above. The camera control unit 204 is arranged to associate the captured image with the vehicle position message output from the phase difference analyser 705 and send this via the communication link to the image database 205 and image processor 206. The image processor 206 can be adapted to perform the image processing only on a vehicle in a position corresponding to the vehicle position message.

Image Processing

Figure 9:
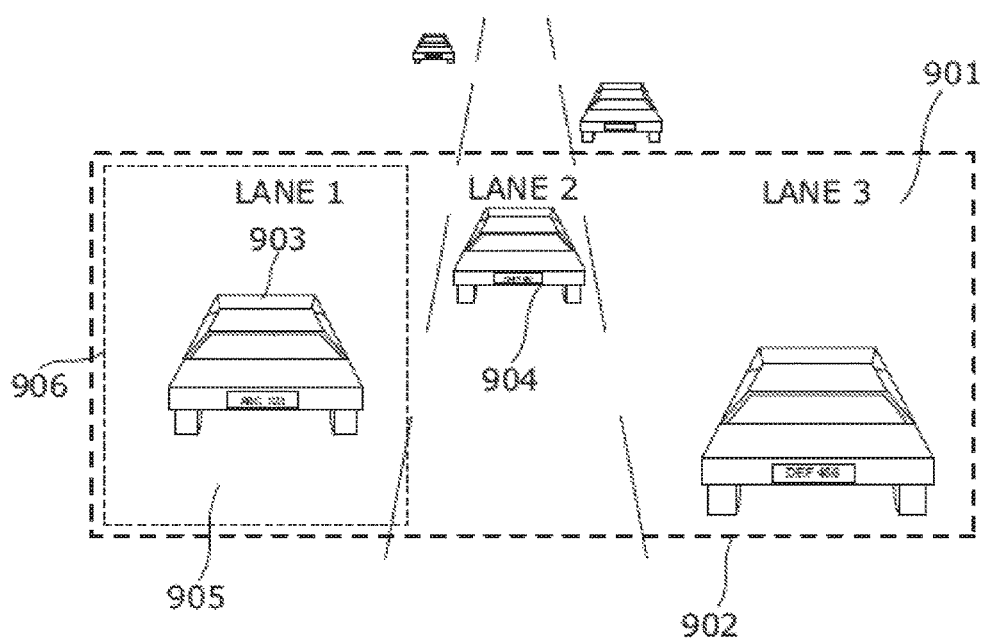
FIG. 9 provides a schematic diagram illustrating an image taken from a camera positioned on a gantry in accordance with examples of the invention, and FIG. 10 provides a flow chart of a method in accordance with an example of the invention.

FIG. 9 provides a schematic diagram illustrating an image 901 taken from a camera positioned on a gantry in accordance with examples of the invention. FIG. 9 shows a scene as cars travel under and recede from the gantry and a thick broken line 902 illustrates an area captured in the image 901. The image 901 is typical of an image captured by the camera and processed by the image processor.

The timing of the image capture and the direction and focus of the camera are typically calibrated (for example by the camera control unit) such that a vehicle travelling within the range of normal speeds will appear within the area captured in the image 901 if the detectors detect an interfering signal as described above.

As can be seen from FIG. 9, three vehicles have been captured within the image 901.

In examples in which directional antennas are used, it is possible to determine which of the first, second and third lane the vehicle that triggered the image capture is positioned when the image 901 is captured. For example, if a directional antenna on the gantry directed along the first lane (LANE 1) detects an interfering signal, this will indicate that the vehicle 903 on the left of the image 901 contains a jamming device emitting an interfering signal.

In examples in which the difference between the phase of the signal received at first and second receivers is monitored, it is also possible to determine which of the first, second and third lane the vehicle that triggered the image capture is positioned when the image 901 is captured. For example, a phase difference as illustrated in FIG. 6b would suggest that the vehicle 904 is in the centre of the image 901 (i.e. in LANE 2) contains a jamming device emitting an interfering signal. It should be noted that the phase difference method can also provide more accurate information about the speed and exact position of the vehicle which makes the identification of the vehicle within the image more certain.

As can be understood from FIG. 9, once a position of the vehicle suspected of containing the jamming device is determined, this can be used by the image processor 206 to identify identification plates in a corresponding part of the image.

For example, if the vehicle 903 on the left of the image is suspected of containing a jamming device, the image processor 206, may restrict its image processing analysis to attempting to recognise identification plates in the area 905 identified by the thin broken line 906.

Figure 10:
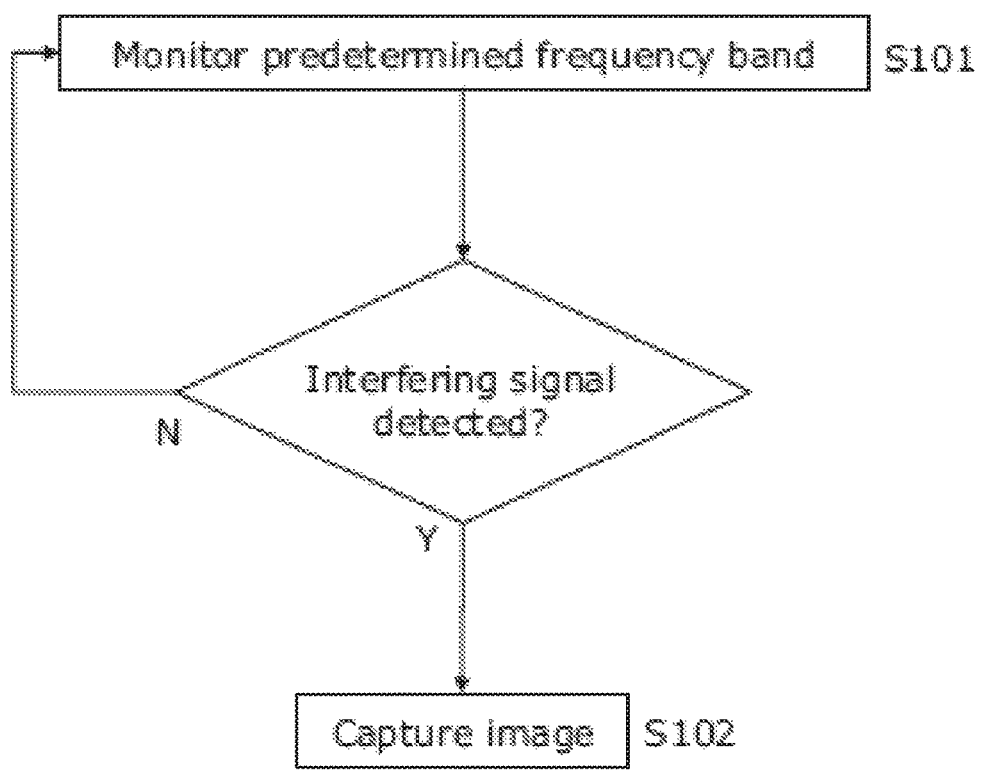

FIG. 10 provides a flow chart of a method in accordance with an example of the invention. At a first step S101 the predefined frequency band is monitored at a first location to identify an emission of an interfering signal from a passing vehicle. If an interfering signal is detected, at a second step S102, the method further comprises capturing a first image of the passing vehicle.

Various modifications can be made to the examples of the invention described above.

In the examples described above, the technique for identifying vehicles containing jamming devices has been described largely in terms of the interfering signal being one intended to interfere with the operation of a GNSS tracker device (i.e. an interfering signal transmitted with GNSS frequency bands). However, in other examples it is possible that the interfering signal will be one that interferes with the reception and/or transmission of cellular network signals or, more generally, with the interference of the reception or transmission of any signal used in tracking devices. In such examples, the detector can be adapted accordingly to detect the emission of signals in any required part of the frequency spectrum.

Further, the examples described above have been described in terms of a motor vehicle travelling along a road and cameras and detectors positioned relative to the road on a gantry. It will be understood that the cameras and or detectors can be fitted to any suitable structure, in any suitable arrangement, for example on stand alone mountings, on any other suitable piece of street furniture or within a mobile unit, for example within a vehicle operated by a law enforcement agency or a handheld unit, operated by a human operator.

Further, it will be understood that the system diagrams shown in FIGS. 2, 3 and 7, show essentially logical designations, and that the functions of the components depicted therein, for example the processor within the detector, the camera control unit, the interface, the image database and the image processor can be implemented in any suitable way for example within a single processor, or distributed across a plurality of interconnected processors.

Further, it will be understood that techniques according to the present invention are not necessarily restricted to applications involving motor vehicles, and can include other vehicles such as boats, aircraft and so on.

Further, in some examples, the invention will be manifested as software (i.e. one or more computer programs) comprising computer readable instructions which when run on one or more processors, perform the functions associated with the invention, for example causing one or more processors to perform the steps illustrated in FIG. 10.

The invention claimed is:

1. A method of identifying a vehicle-borne transmitter emitting an interfering signal over a predefined frequency band, the method comprising:
    monitoring the predefined frequency band at a first location to identify an emission of an interfering signal from a passing vehicle, wherein, if an interfering signal is detected, the method further includes:
    capturing a first image of the passing vehicle to enable an identity of the passing vehicle to be determined,
    wherein the monitoring of the frequency band at the first location includes:
    collecting phase change data corresponding to a change in a phase difference between a first phase and a second phase, the first phase being a phase of the interfering signal received at a first position and the second phase being a phase of the interfering signal received at a second position, and
    estimating from the phase change data a position of the passing vehicle in the image by:
        fitting the phase change data to a phase change model, the phase change model being a model of the change in the phase difference between the first and second phase using a set of parameters, the parameters including a speed and track of a vehicle,
        determining parameters of the model,
        generating from the parameters of the model an estimated track and estimated speed of the passing vehicle, and
        using the estimated track and estimated speed of the passing vehicle to determine a position of the passing vehicle within the captured image.

2. The method according to claim 1, further comprising: performing an image recognition process on the first image to recognize a feature of the passing vehicle.

3. The method according to claim 2, wherein the recognized feature is an identifier plate.

4. The method according to claim 1, further comprising: capturing time data associated with a time at which the image was captured, and/or capturing location data associated with the first location.

5. The method according to claim 4, further comprising generating a vehicle tracking message comprising recognized identifier plate details of the passing vehicle and the time and/or location data, and
sending the vehicle tracking message to a third party.

6. The method according to claim 3, further comprising: searching a vehicle identity database including vehicle details associated with identifier plate details to determine an identity of the passing vehicle based on the recognized identifier plate.

7. The method according to claim 1, wherein monitoring the frequency band at the first location comprises:
    monitoring the frequency band with a plurality of directional antennas, each directional antenna directed in a predetermined direction, and
    estimating a position of the vehicle in the first image based on which of the directional antennas detected the interfering signal.

8. The method according to claim 7, wherein each predetermined direction corresponds to a lane of a road.

9. The method according to claim 1, wherein the predefined frequency is monitored at a plurality of further locations, the method further comprising
    capturing further images at each of the further locations where interfering signal is detected, and
    analyzing the first image and the further images by identifying vehicles common to the first image and at least some of the further images to identify the passing vehicle emitting the interfering signal.

10. The method according to claim 7, further comprising:
    capturing time data associated with a time at which the first image and further images were captured, and
    capturing location data associated with the first location and further locations at which the first images and further images were captured.

11. The method according to claim 10, further comprising:
    estimating a direction and/or speed of the passing vehicle based on the time data and location data.

12. The method according to claim 1, wherein the predefined frequency band is a frequency band within which GNSS signals are transmitted.

13. The method according to claim 1, wherein the first location is a gantry positioned over a road.

14. A system for identifying a vehicle-borne transmitter emitting an interfering signal over a predefined frequency band, the system comprising:
    a detector positioned at a first location configured to monitor the predefined frequency band and to identify an emission of an interfering signal from a passing vehicle, and
    a camera that operates such that, if the detector detects an interfering signal, the detector is configured to send a trigger signal causing the camera to capture a first image of the passing vehicle thereby enabling an identity of the passing vehicle to be determined;
    wherein the detector operates such that the monitoring of the frequency band at the first location includes:

collecting phase change data corresponding to a change in a phase difference between a first phase and a second phase, the first phase being a phase of the interfering signal received at a first position and the second phase being a phase of the interfering signal received at a second position, and estimating from the phase change data a position of the passing vehicle in the image by:

fitting the phase change data to a phase change model, the phase change model being a model of the change in the phase difference between the first and second phase using a set of parameters, the parameters including a speed and track of a vehicle, determining parameters of the model, generating from the parameters of the model an estimated track and estimated speed of the passing vehicle, and using the estimated track and estimated speed of the passing vehicle to determine a position of the passing vehicle within the captured image.

15. The system according to claim 14, further comprising an image processor configured to perform an image recognition process on the first image to recognize a feature of the passing vehicle.

16. The system according to claim 15, wherein the recognized feature is an identifier plate.

17. The system according to claim 16, further comprising a camera control unit configured to capture time data associated with a time at which the image was captured, and/or capture location data associated with the first location.

18. The system according to claim 17, wherein the image processor is configured to receive the time data and location data generated by the camera control unit and generate a vehicle tracking message comprising recognized identifier plate details of the passing vehicle and the time and location data, the image processor being operable to send the vehicle tracking message to a third party.

19. The system according to claim 14, wherein the detector includes a plurality of directional antennas, each directional antenna directed in a predetermined direction, the detector configured to communicate a message to the image processor indicating which directional antenna detected the interfering signal, the image processor configured to identify a position of the vehicle based on which of the directional antennas detected the interfering signal.

20. The system according to claim 14, wherein each predetermined direction corresponds to a lane of a road.

21. The system according to claim 14, comprising detectors and cameras at a plurality of further locations configured to capture further images at each of the further locations where interfering signal is detected, and the image processor is configured to analyze the first image and the further images by identifying vehicles common to the first image and at least some of the further images to identify the passing vehicle emitting the interfering signal.

22. The system according to claim 21, further including respective camera control units at each further location, each camera control unit configured to capture time data associated with a time at which each further image is captured, and to capture location data associated with each respective further location at which each further image is captured.

23. The system according to claim 14, wherein the detector comprises a first antenna at a first position and a second antenna at a second position and a phase difference analyzer unit, the phase difference analyzer unit configured to collect data corresponding to a change in a phase difference between a first phase and a second phase, the first phase being a phase of the interfering signal received by the first antenna and the second phase being a phase of the interfering signal received by the second antenna, and the image processor is configured to estimate a position of the passing vehicle in the image from an output of the phase difference analyzer unit.

24. The system according to claim 23, wherein the phase difference analyzer is configured to:

fit the phase change data to a phase change model, the phase change model being a model of the change in the phase difference between the first and second phase using a set of parameters, the parameters including a speed and track of a vehicle, determine parameters of the model, generate from the parameters of the model an estimated track and estimated speed of the passing vehicle, transmit data corresponding to the estimated track and estimated speed of the passing vehicle to the image processor, thereby enabling the image processor to estimate a position of the passing vehicle in the image.

25. The system according to claim 14, wherein the predefined frequency band is a frequency band within which GNSS signals are transmitted.

26. The system according to claim 14, wherein the first location is a gantry positioned over a road.

27. A computer program comprising computer readable instructions which when loaded on a computer performs a method according to claim 1.

28. A computer program product comprising a computer program according to claim 27.

* * * * *